(No Model.)
J. M. BLONDELL.
WHIFFLETREE.
No. 449,647. Patented Mar. 31, 1891.
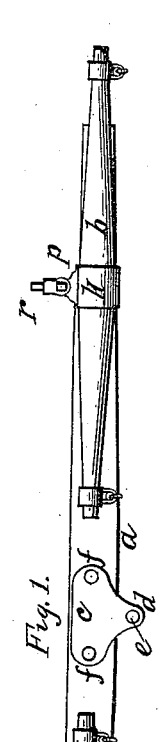
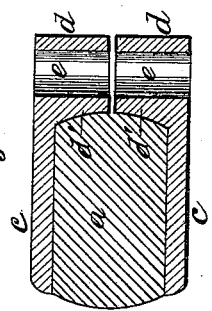
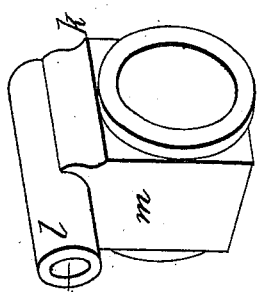
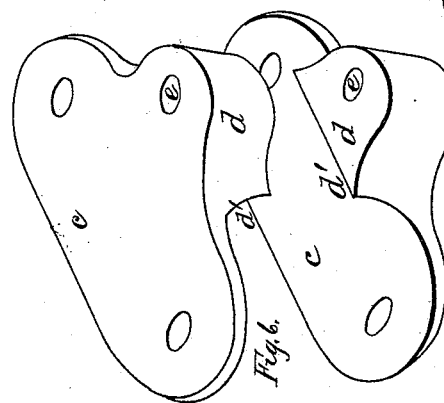
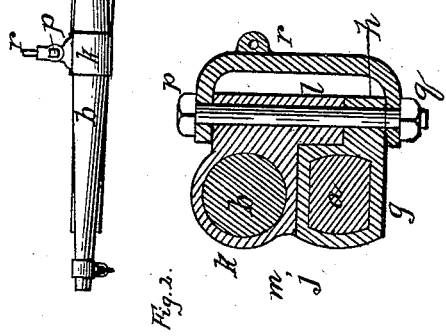
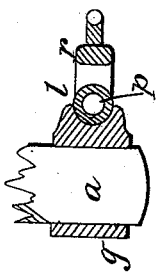
WITNESSES
INVENTOR
John M. Blondell
his Attorney.

UNITED STATES PATENT OFFICE.

JOHN M. BLONDELL, OF BALTIMORE, MARYLAND, ASSIGNOR TO FREDERICK E. TOBE, OF SAME PLACE.

WHIFFLETREE.

SPECIFICATION forming part of Letters Patent No. 449,647, dated March 31, 1891.

Application filed August 7, 1890. Serial No. 361,381. (No model.)

*To all whom it may concern:*

Be it known that I, JOHN M. BLONDELL, a citizen of the United States, residing at Baltimore, in the State of Maryland, have invented certain new and useful Improvements in Whiffletrees; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to whiffletrees for draft-poles; and it consists of certain novel parts and combinations of parts, the separate features of which will be separately and specifically pointed out in the claims concluding this specification, in connection with the accompanying drawings, in which—

Figure 1 represents a top view of the whiffletree and its singletrees. Fig. 2 shows a vertical cross-section of the same, taken through the singletree-pivot connection. Fig. 3 is a horizontal section of the same, and Fig. 4 shows in perspective the pivot-coupling parts of the singletree. Fig. 5 is a vertical section of the whiffletree-coupling plates, and Fig. 6 shows said whiffletree-coupling plates in separate relation.

The object of my improvement is to provide for the convenient and ready application of the pivot-coupling parts of the double and single trees, and to render the couplings and the tree parts more durable.

$a$ is the whiffletree, and $b$ are the singletrees. The coupling for the whiffletree is cast of two like parts, each having a flat part $c$ and a projecting shoulder part $d$, which are considerably thicker than the plate parts and are formed with openings $e$ to receive the bolt (not shown) which couples the doubletree to the pole or coupling-jaw of the vehicle. These two plate parts of like construction are secured one on the top and the other on the under side at the middle of the length of the doubletree by stay-bolts $f$, which pass through both upper and lower plates near their ends and are secured by nuts, so as to firmly clamp and bind the plates to the tree with the shouldered parts $d$ standing over the front and abutting against the front side of the tree and forming an abutment-bearing $d$ for the tree for sustaining the draft and taking the strain off the tree and relieving the strain upon the plate-bolts. These overhanging shouldered parts $d$ nearly come together, and their openings are coincident to receive the vehicle coupling-bolt, so that the latter must pass through the coupling-plates at the front side of the tree. This construction avoids the serious objection of piercing the doubletree to receive the bolt for coupling it to the vehicle, for when so bored the doubletree is thereby weakened and the draft is thereby only sustained by part of the width of the tree.

The singletree-coupling I make of two sleeve parts—one for receiving the end of the doubletree and one for receiving the singletree—and I connect these parts by a vertical knuckle-joint located at the rear side of the trees, as I shall now describe, to give strength and durability to all the parts.

The sleeve part $g$ of the doubletree has an angular opening of a size to allow it to be driven on the end of the tree and is formed with a projecting lower knuckle or eyed bearing part $h$ at its rear side for about half the width of the sleeve part, and above this knuckle-bearing part the other half of the sleeve is formed with a half-cylindrical socket bearing part $i$, opening at the flat top $j$ of the casting.

The sleeve part $k$ of the singletree has an opening of a size to receive the tree to which it is secured at the middle of its length, and is formed at its rear side with a cylindrical-eyed knuckle part $l$, which extends down below its flat lower side $m$, and is adapted to fit into the knuckle-socket $i$ of the sleeve $g$ of the doubletree, so that the flat sides $m$ and $j$ of the two sleeve parts form the supporting-bearing, while the abutting knuckle-joint-forming parts $h$, $i$, and $l$ form the draft-bearing, the eye $n$ in each part being coincident to receive the pivot-bolt $p$, which is secured by a nut $q$. These sleeve parts are fastened to their respective trees by wood-screws.

The advantages of this construction are that the sleeve-coupling parts are cast complete for intermatching relation and ready for application to the trees by simply driving them on and uniting them by the knuckle-pivot bolt. It avoids the serious objection of piercing the trees to receive the draft-bolt. It gives greater strength to the draft-coupled parts by the provision of a knuckle-shouldered bearing which relieves the strain upon the coupling-bolt and lessens the wear of the coupled parts.

$r$ is the usual loop, one at each end of the doubletree, to which a chain is attached for limiting the swinging movement of the doubletree. These loops are secured to the knuckles of the coupling-sleeves by the coupling-bolt instead of to the bolt passing through the trees direct.

I claim as my improvement—

1. The combination of the doubletree $a$, its attaching device consisting of the plates $c\ c$, each having an abutment $d\ d'$, arranged against and covering the front side of said doubletree and having vertical coincident holes $e\ e$ to receive the bolt, which couples it to the pole, whereby the pull of the doubletree is against the abutments in front of the tree and is sustained by the abutments, as shown and described.

2. In a draft-whiffletree, the combination of the double and singletrees, the coupling device therefor consisting of the casting $g$, formed of a sleeve-band adapted to be driven upon the doubletree, one side of said band having formed thereon the eyed part $h$ and the socket part $i$, and the casting $k$, formed of a sleeve-band adapted to be driven upon the singletree, one side of said band having formed thereon the knuckle part $l$ and the bolt $p$, whereby the said sleeve-bands re-enforce and strengthen the trees at the points of draft.

3. In a draft-whiffletree, the combination of the doubletree, the singletrees, and their coupling-knuckle sleeve parts having an eyed shoulder or projection at the side of the tree, the loop, and the coupling-bolt for securing the loop to the knuckled coupling parts.

In testimony whereof I affix my signature in presence of two witneses.

JOHN M. BLONDELL.

Witnesses:
JOSEPH J. WELLER,
ALONZA STIDHAM.